United States Patent [19]

Prior

[11] 4,301,198
[45] Nov. 17, 1981

[54] BUILDING COMPONENT AND METHOD OF MAKING THE SAME

[76] Inventor: John C. Prior, 321 Cedar, Centralia, Ill. 62801

[21] Appl. No.: 62,680

[22] Filed: Aug. 1, 1979

Related U.S. Application Data

[63] Continuation of Ser. No. 826,323, Aug. 22, 1977, abandoned.

[51] Int. Cl.³ .......................... B32B 1/06; E04C 1/40
[52] U.S. Cl. ........................................ 428/2; 428/76; 428/74; 156/305; 52/309.14; 52/309.15; 52/DIG. 9
[58] Field of Search ............... 156/245, 305, 278, 279, 156/293; 428/2, 68, 74, 76, 438; 52/309.14–309.15, DIG. 9

[56] References Cited

U.S. PATENT DOCUMENTS

| | | | |
|---|---|---|---|
| 1,475,674 | 11/1923 | Armstrong | 428/138 X |
| 2,113,068 | 5/1938 | McLaughlin | 428/74 |
| 2,160,001 | 5/1939 | Saborsky | 428/74 |
| 2,782,465 | 2/1957 | Palmer | 52/309.15 |
| 3,020,183 | 2/1962 | Calvaresi | 428/74 |
| 3,650,871 | 3/1972 | Bentfors | 428/2 X |
| 3,664,076 | 5/1972 | McCoy | 428/2 X |

Primary Examiner—George F. Lesmes
Assistant Examiner—Alexander S. Thomas
Attorney, Agent, or Firm—Cohn, Powell & Hind

[57] ABSTRACT

This building component includes a peripheral sidewall and upper and lower walls forming a casing; a core of shredded waste material and an exterior plastic skin covering the casing. The method of making the component includes the steps of filling a peripheral form with shredded waste material, closing the form at the upper and lower ends and incorporating it into the component by applying a reinforced plastic binder over the closed form.

2 Claims, 12 Drawing Figures

BUILDING COMPONENT AND METHOD OF MAKING THE SAME

This is a continuation of application Ser. No. 826,323, filed Aug. 22, 1977, now abandoned.

BACKGROUND OF THE INVENTION

This invention relates generally to a building component and particularly to a multipurpose component having a reinforced plastic skin over a built-in form.

Among the desirable characteristics for building components, particularly those of rather large size such as 8 feet by 4 feet panels, are strength, lightness, resistance to corrosion, sound and heat insulation, fire resistance, inexpensive manufacture, low installation cost and the ability to be used for inside or outside work. Plywood has some of these qualities; it is lightweight and relatively strong, but it is deficient in insulation and fire resistance, requires special treatment for outside use and is costly to install. Gypsum board is a fairly good insulator when used in drywall frame construction, but it is relatively heavy and has little structural strength. Various composite panels are known which employ a urethane foam core with an outer skin of steel or preformed plastic but these tend to be special purpose panels which are expensive to manufacture.

The present component avoids the disadvantages inherent in known prior art components.

SUMMARY OF THE INVENTION

This building component is strong and lightweight and has superior fire resistance and insulation qualities. It can be readily made from waste materials and is therefore inexpensive to manufacture.

This component can be used for outside construction and is particularly useful in the construction of service buildings, such as warehouses. It can also be used for inside construction where it finds particular use as a heat and sound insulating panel. It is rigid and the strength can be readily controlled. In addition, it is sufficiently lightweight that one 8 feet × 4 feet × 6 inch panel can be handled by one man.

This building component consists of a form of sheet material; an interior core of shredded material and an exterior skin of a reinforced plastic binder such as fiberglass reinforced resin. The form includes a peripheral sidewall and upper and lower walls which cooperate to form a closed casing beneath the exterior skin.

The sheet material providing the form casing is of cardboard or similar material and the interior core is of shredded waste material such as fiberglass or the like, and the reinforced plastic binder is partially absorbed through the cardboard to contact the interior core in adhesive relation.

The method of making the building component comprises the steps of placing a bottom layer on a work table; placing a sidewall form on top of the bottom layer; filling the sidewall form with core material; placing a top layer on the sidewall form and applying a reinforced plastic binder to the upper, lower and side surfaces.

The bottom layer of the component is a flat sheet having portions extending outwardly of the sidewall and being folded in overlapping relation with said sidewall and being adhesively secured to the sidewall by the reinforced plastic binder.

This building component is relatively inexpensive to manufacture and can be at least partially formed from recycled and waste material which would otherwise provide a difficult disposal problem. Further, it is readily adaptable, in whole or in part to manufacture by automatic or semi-automatic mass production techniques as well as manufacture by hand.

DESCRIPTION OF THE PREFERRED EMBODIMENT

Figure 1:
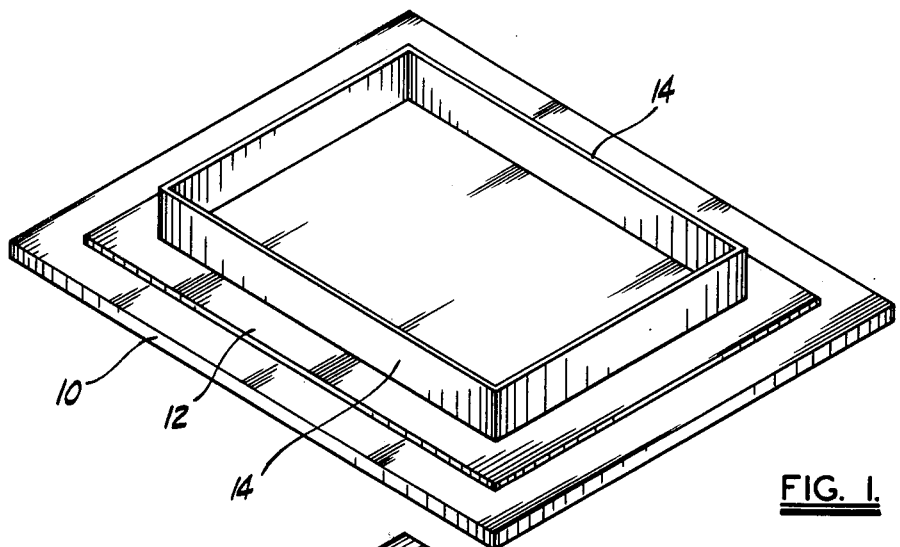
FIG. 1 is a perspective, somewhat diagrammatic view illustrating the first stage of the method of producing the building component.

Referring now by reference numerals to the drawing and first to FIGS. 1 through 5, it will be understood that FIG. 1 illustrates the initial phase of producing the building component in a somewhat diagrammatic form. Essentially, as shown in FIG. 1 a flat sheet 12 is disposed on a work table 10. The sheet 12 constitutes a bottom layer and in the embodiment shown is of carboard or the like. A peripheral sidewall form 14, having a generally rectangular configuration and formed from similar sheet material, is disposed on top of the sheet 12. As will be observed sheet 12 is substantially larger in area than the sidewall form 14 and extends beyond said sidewall form on each of the four sides.

Figure 2:
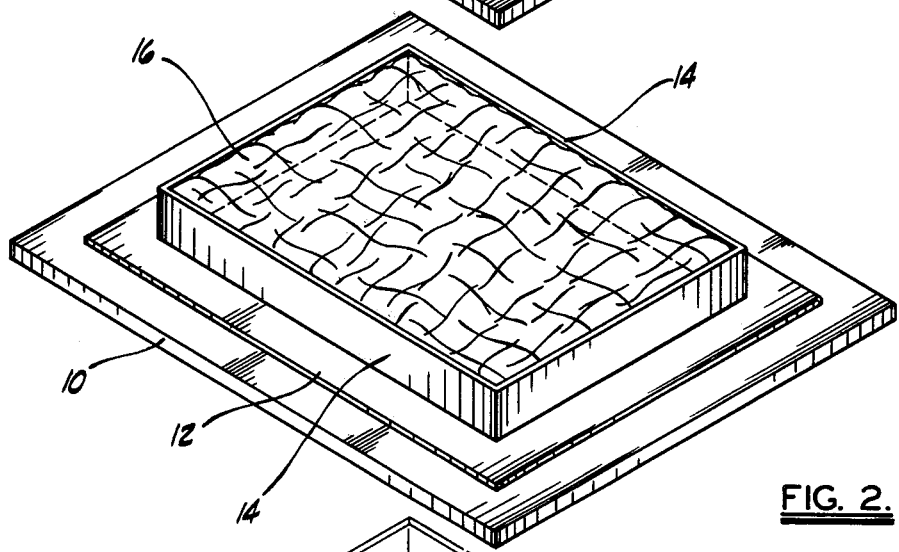
FIG. 2 is a similar view illustrating the second stage.
Figure 3:
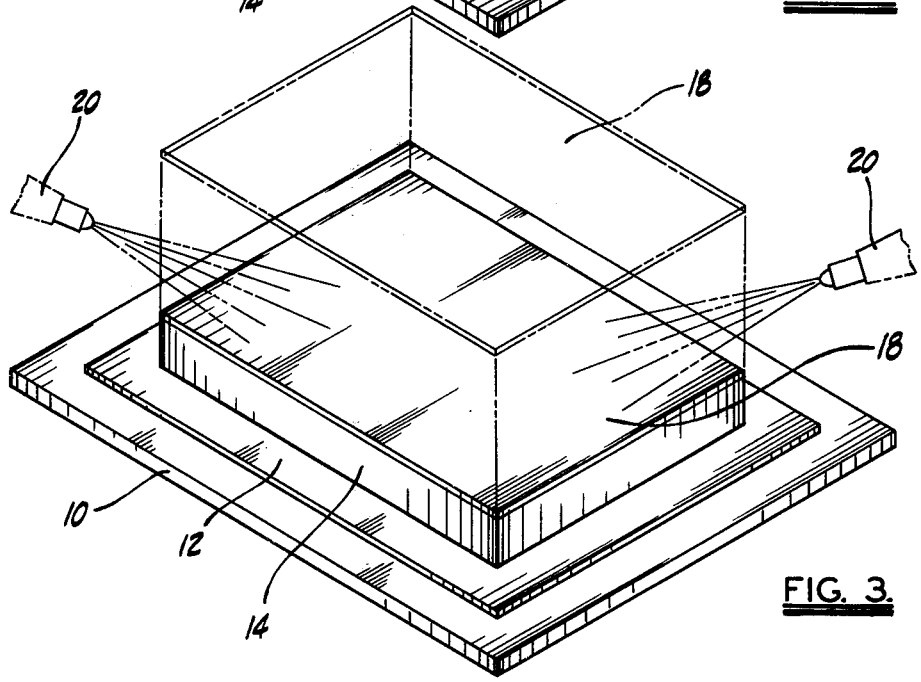
FIG. 3 is a similar view illustrating the third stage.
Figure 4:
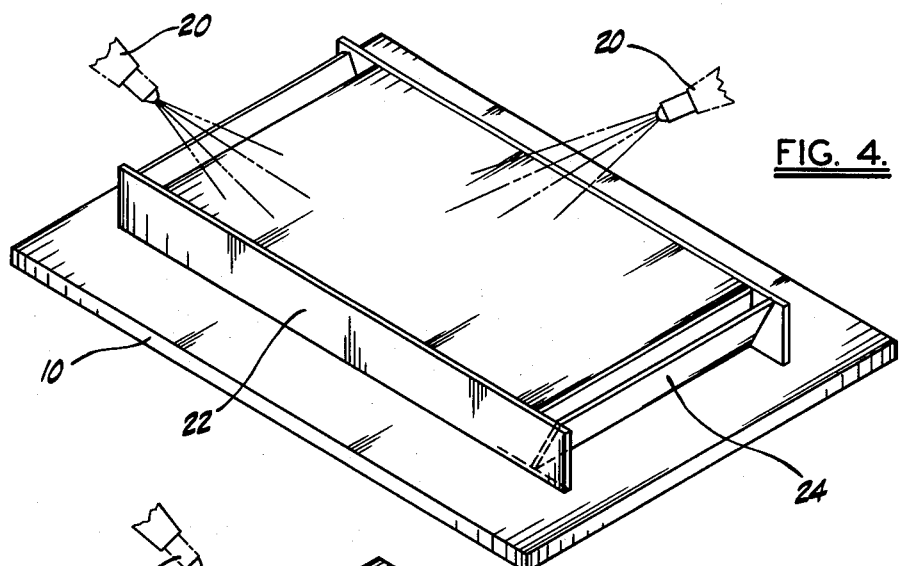
FIG. 4 is a similar view illustrating the fourth stage.
Figure 5:
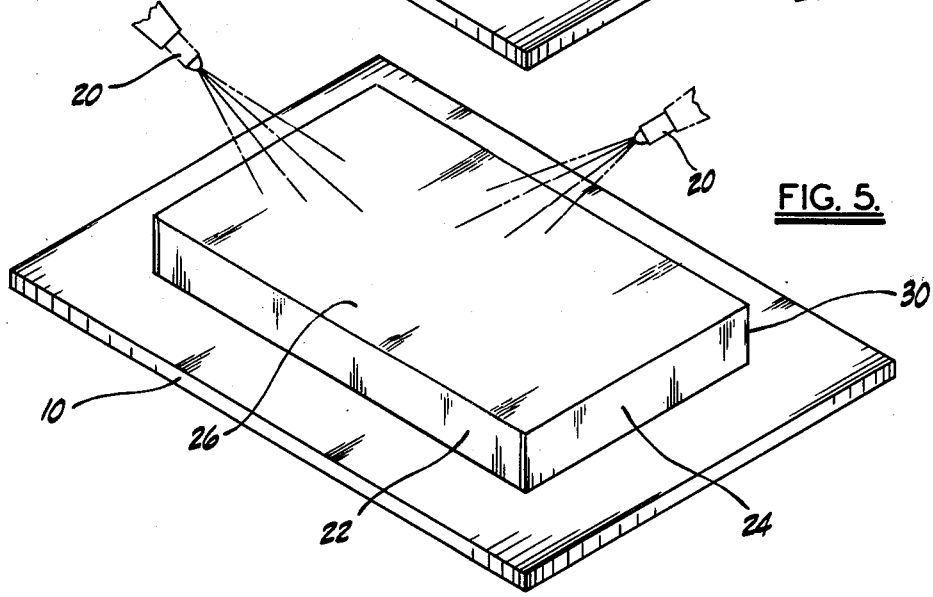
FIG. 5 is a similar view illustrating the fifth stage and showing the finished component.

As shown in FIG. 2, the open box configuration formed by the bottom sheet 12 and the sidewall form 14 is filled with a fragmented material such as shredded waste fiberglass rubber, or sawdust or the like indicated by numeral 16, which constitutes core material. After the open box has been filled a top sheet 18, see FIG. 3, also of similar material to the bottom sheet 12 and having a size corresponding substantially to the dimensions across the sidewall form 14 is disposed on top of said sidewall form to form a closed casing. Following this operation the top sheet 16 and sidewall form 14 are coated with a plastic reinforced binder from nozzles 20. The reinforced plastic binder effectively seals and adheres the parts together and forms a rigid exterior skin. The plastic reinforced binder may be formed from any of a number of different resins, such as polyester, epoxy, polyurethane and the like in conjunction with the appropriate catalyst and reinforced with synthetic or natural fibers. By way of example it will be assumed that a plastic reinforced binder, of the type well known in the automobile and boating industry for forming automobile bodies and boat hulls is used such binder being sprayed from a gun represented in FIG. 3 by nozzle 20. The gun delivers converging streams of resin and fiberglass particles which have been chopped from a continuous spool fed strand prior to being issued from the nozzle 20. Following this initial coating operation, as shown in FIG. 4, portions of the bottom sheet 12 indicated respectively by numerals 22 and 24, are folded upwardly to form side flaps 22 and 24 respectively, which are temporarily attached to the sidewall form 14 as by staples (not shown). The flaps are then sprayed to provide a completed box. After the completion of this operation the component is inverted and the bottom thereof is then coated as by spraying with the resin and fiberglass composition from nozzles 20. After this final stage the finished component indicated by numeral 30 is ready for use.

Importantly, the carboard forming the casing should be of a thickness and density which will permit the plastic binder to be absorbed through it into adhering contact with the shredded fiberglass waste material forming the core of the component 30. Recycled cardboard having a thickness of about 60 mils has been found satisfactory for this purpose. Other materials, including fiberglass sheets and hardboard can be used.

Figure 6:
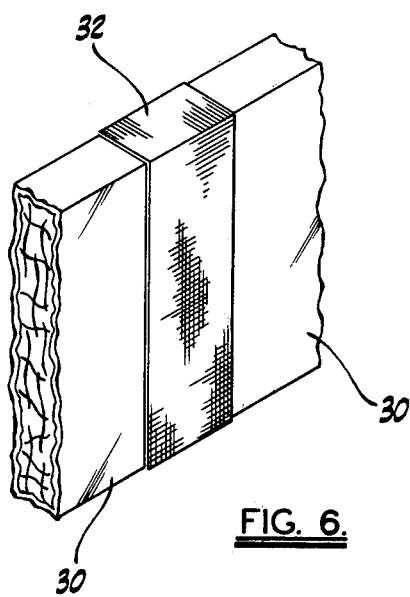
FIG. 6 is a perspective view which illustrates the manner in which two components are joined together.
Figure 7:
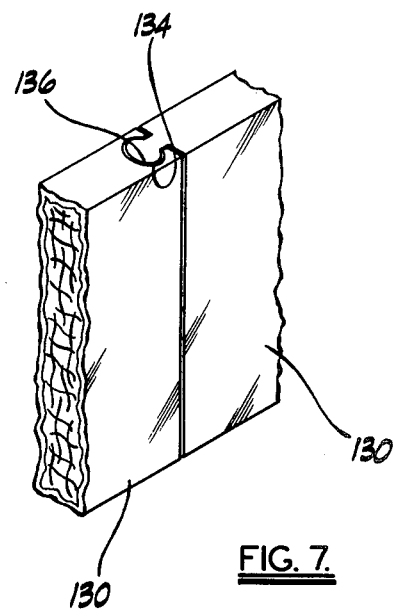
FIG. 7 is a similar view which illustrates an alternative method of joining two components together.

If it is desired to join one or more of the components 30 together this is accomplished, as shown in FIG. 6, by wrapping a strip of fiberglass matting tape indicated by numeral 32 around the joint and spraying or otherwise coating the tape joining the two components with the reinforced plastic binder. Alternatively, as shown in FIG. 7 modified components indicated by numerals 130 may be used having preformed interlocking portions 134 and 136 which can be coated with the reinforced binder to ensure a strong joint.

Figure 8:
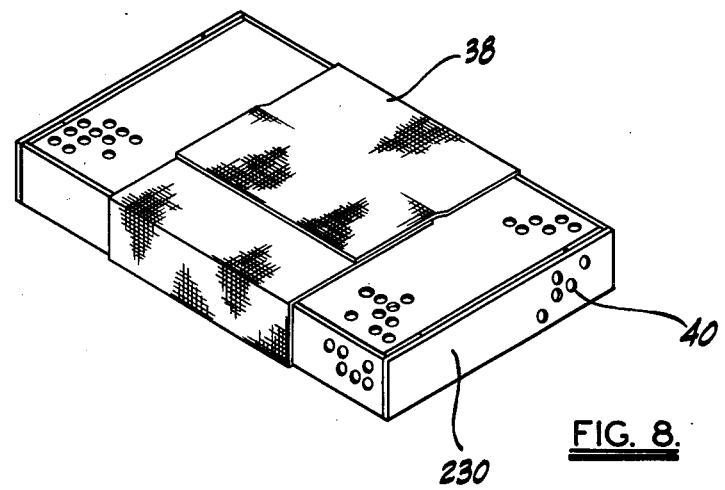
FIG. 8 is a perspective view of a modified component.

It will be understood that the strength of the product is derived from the reinforced plastic binder forming the exterior skin and penetrating into the interior through the relatively weak outer casing. As shown in the modified component 230 of FIG. 8, the outer casing of the component can be reinforced with fiberglass matting web indicated by numeral 38, which when coated with the resin binder, results in an extremely strong and durable component. As also shown in FIG. 8 the thin wall casing can be provided with perforations generally indicated by numeral 40 (shown enlarged for clarity) to ensure adequate absorption of the binder therethrough.

Figure 9:
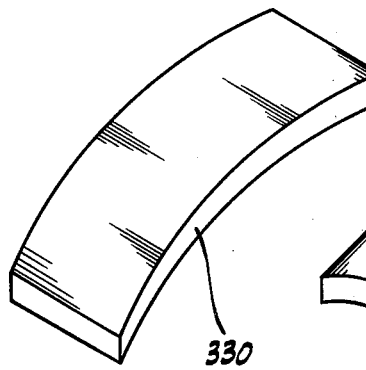
FIGS. 9, 10 and 11 are perspective views illustrating various component configurations.
Figure 10:
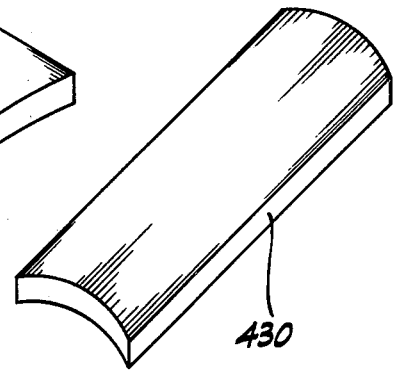
Figure 11:
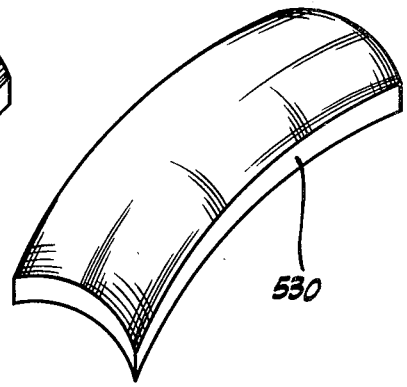

FIGS. 9, 10 and 11 illustrate various configurations into which a basic rectangular component can be formed. FIG. 9 shows a component 330 which is curved lengthwise for providing an arch structure. FIG. 10 shows a similar arched component 430 curved widthwise and FIG. 11 shows a domed component 530. It will be understood that the curvature can be achieved by providing a suitable supplementary support on the table and by providing a sidewall form with built in curvature.

Figure 12:
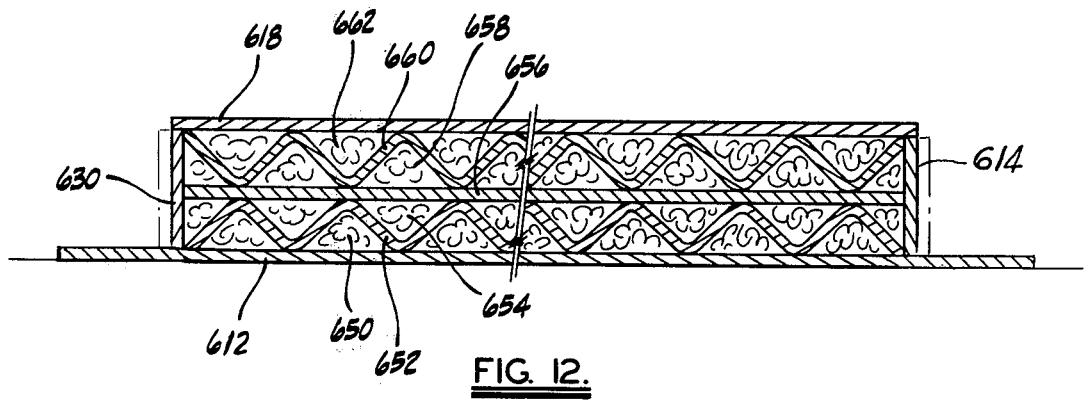
FIG. 12 is an enlarged fragmentary cross sectional view of a component having a reinforced core.

FIG. 12 illustrates an internally reinforced component 650. Essentially, except for the placing of the corrugated reinforcing members, the method of manufacturing this component is similar to that described above with respect to component 30. One or more layers of lengthwise extending corrugated bracing members such as those indicated by numerals 652 and 660 can be used, said members being separated by an intermediate panel 656. Briefly, a first layer of core material indicated by numeral 650 is disposed within the form 614 lying above the bottom sheet 612 and the corrugated bracing member 652 is disposed on top of said core material. A second layer of core material 654 is disposed above the corrugated bracing member 652 followed by the intermediate panel 656. The reinforced plastic binder material is then sprayed or otherwise applied to the intermediate panel 656. The same procedure is followed with respect to the core material 658, the corrugated bracing member 660 and the core material 662, following which the top sheet 618 is placed in position. The remaining procedure is substantially as described with respect to the component 30. It will be understood that the upper faces of the corrugated members 652 and 656 can have binder applied to them for additional strength if desired.

It will be readily understood that the wool-like consistency of core material such as shredded waste fiberglass provides a lightweight component which can be used for flotation devices such as boat docks, piers, stationary swimming-diving rafts and the like. If desired the components can be sprayed while under compression. This results in an extremely rigid and self-supporting structural component, which can be used as a structural beam member for items such as railroad ties.

If desired, a bottom layer which consists of a parting agent in lieu of the cardboard bottom sheet 12 can be used and the table inverted following the spraying of the top and sides so that the open bottom can then be sprayed with the fiberglass composition.

It will also be readily understood that the method is subject to conveyor belt operation when high production is required. In this instance the nozzles 20 shown in FIGS. 3 and 5 will be provided by different sets of nozzles at different stations and the work table 10 will be substituted by a conveyor belt.

I claim:
1. A building component comprising:
 (a) a built-in form of fibrous material, including sidewalls and upper and lower walls providing a closed interior casing,
 (b) an interior core of shredded material disposed within the form,
 (c) an exterior casing of plastic binder reinforced with fiber strand particles and forming a substantially rigid and complete cover sealing the sidewall and upper and lower walls,
 (d) the form being of absorbent material permitting the passage of binder therethrough,
 (e) the interior core being of shredded fiberglass material, and
 (f) the binder forming the exterior casing penetrating the absorbent form material to contact and adhere to the interior core material.
2. A component as defined in claim 1, in which:
 (g) the built-in form is of cardboard,
 (h) the core material is shredded fiberglass waste and fiberglass reinforced resin in contact with said waste in an adhesive relationship, and
 (i) the plastic binder is chopped fiberglass reinforced resin.

* * * * *